US011163321B1

(12) United States Patent
Tang et al.

(10) Patent No.: US 11,163,321 B1
(45) Date of Patent: Nov. 2, 2021

(54) OBSTACLE-AVOIDING SPRAYING METHOD AND DEVICE FOR PLANT PROTECTION UNMANNED AERIAL VEHICLE, COMPUTER DEVICE AND STORAGE MEDIUM

(71) Applicant: Guangdong Polytechnic Normal University, Guangzhou (CN)

(72) Inventors: Yu Tang, Guangzhou (CN); Huasheng Huang, Guangzhou (CN); Shaoming Luo, Guangzhou (CN); Qiwei Guo, Guangzhou (CN); Xincai Zhuang, Guangzhou (CN); Jiahao Li, Guangzhou (CN); Jiepeng Yang, Guangzhou (CN); Chaojun Hou, Guangzhou (CN); Jiajun Zhuang, Guangzhou (CN); Aimin Miao, Guangzhou (CN); Xuan Chu, Guangzhou (CN)

(73) Assignee: Guangdong Polytechnic Normal University, Guangzhou (CN)

( * ) Notice: Subject to any disclaimer, the term of this patent is extended or adjusted under 35 U.S.C. 154(b) by 0 days.

(21) Appl. No.: 17/191,584

(22) Filed: Mar. 3, 2021

(30) Foreign Application Priority Data

Jul. 6, 2020 (CN) .......................... 202010640517.2

(51) Int. Cl.
*G06F 17/00* (2019.01)
*G05D 1/10* (2006.01)
(Continued)

(52) U.S. Cl.
CPC ........... *G05D 1/106* (2019.05); *B64C 39/024* (2013.01); *B64D 1/18* (2013.01); *G06K 9/00657* (2013.01);
(Continued)

(58) Field of Classification Search
CPC .......... G05D 1/106; G06N 3/049; G06N 3/08; G06K 9/6256; G06K 9/4604;
(Continued)

(56) References Cited

U.S. PATENT DOCUMENTS

2012/0237083 A1* 9/2012 Lange ..................... G06F 16/29
382/103
2014/0303814 A1* 10/2014 Burema ............... A01B 79/005
701/3
(Continued)

*Primary Examiner* — Ronnie M Mancho
(74) *Attorney, Agent, or Firm* — Getech Law LLC; Jun Ye

(57) ABSTRACT

The present application relates to the field of plant protection unmanned aerial vehicles, and discloses an obstacle-avoiding spraying method and device for a plant protection unmanned aerial vehicle, a computer device and a storage medium. Through special designs, the plant protection unmanned aerial vehicle is capable of avoiding obstacles for spraying operation, and the efficiency of the spraying operations is improved on the premise of preventing from blockage of the obstacles. It should be noted that the obstacle-avoiding spraying method for the plant protection unmanned aerial vehicle of the present application needs to be implemented jointly by three unmanned aerial vehicles, but the special part is that it is unnecessary for unmanned aerial vehicle terminals corresponding to the three unmanned aerial vehicles to communicate and interact with each other, such that the method has a wider application range and is easier to implement.

6 Claims, 3 Drawing Sheets

(51) Int. Cl.
*G06K 9/00* (2006.01)
*G06K 9/62* (2006.01)
*G06K 9/46* (2006.01)
*B64C 39/02* (2006.01)
*G06N 3/08* (2006.01)
*G06N 3/04* (2006.01)
*B64D 1/18* (2006.01)

(52) U.S. Cl.
CPC ......... *G06K 9/4604* (2013.01); *G06K 9/6256* (2013.01); *G06N 3/049* (2013.01); *G06N 3/08* (2013.01); *B64C 2201/123* (2013.01); *B64C 2201/127* (2013.01)

(58) Field of Classification Search
CPC .............. G06K 9/00657; B64C 39/024; B64C 2201/123; B64C 2201/127; B64D 1/18
USPC ............................................................ 701/3
See application file for complete search history.

(56) References Cited

U.S. PATENT DOCUMENTS

| | | | |
|---|---|---|---|
| 2016/0307448 A1* | 10/2016 | Salnikov | A01B 79/005 |
| 2016/0334276 A1* | 11/2016 | Pluvinage | G01J 3/28 |
| 2017/0192089 A1* | 7/2017 | Parker | G08G 5/0026 |
| 2018/0188747 A1* | 7/2018 | Venturelli | G08G 5/0026 |
| 2018/0245365 A1* | 8/2018 | Wankewycz | H02J 7/0042 |
| 2018/0316416 A1* | 11/2018 | Reis | H04L 67/12 |
| 2019/0031346 A1* | 1/2019 | Yong | A01G 25/09 |
| 2019/0064794 A1* | 2/2019 | Chen | G05D 1/106 |
| 2019/0097722 A1* | 3/2019 | McLaurin | H01S 5/0087 |
| 2020/0283136 A1* | 9/2020 | Nguyen | B64C 27/08 |
| 2020/0359550 A1* | 11/2020 | Tran | G06T 7/0002 |
| 2020/0389469 A1* | 12/2020 | Litichever | H04L 63/1425 |
| 2021/0073692 A1* | 3/2021 | Saha | G06Q 10/06316 |
| 2021/0129983 A1* | 5/2021 | Ratti | B64B 1/44 |
| 2021/0158041 A1* | 5/2021 | Chowdhary | G05D 1/0246 |

* cited by examiner

OBSTACLE-AVOIDING SPRAYING METHOD AND DEVICE FOR PLANT PROTECTION
UNMANNED AERIAL VEHICLE,
COMPUTER DEVICE AND STORAGE
MEDIUM

TECHNICAL FIELD

The present application relates to the field of plant protection unmanned aerial vehicles, and discloses an obstacle-avoiding spraying method and device for a plant protection unmanned aerial vehicle, a computer device and a storage medium.

BACKGROUND

The plant protection unmanned aerial vehicle is an unmanned aircraft for plant protection in agriculture and forestry, and includes a spraying mechanism to realize spraying operation, which may spray medicines, seeds, powder, etc. During spraying operation, the lower the plant protection unmanned aerial vehicle is off the ground, the better the effect is. However, the lower the plant protection unmanned aerial vehicle is, the easier it is to encounter obstacles, such that it is liable to cause crash of the unmanned aerial vehicle and cause serious economic loss. Therefore, the spraying operation of the traditional plant protection unmanned aerial vehicle is difficult to solve the obstacle obstruction problem of low-altitude flight.

SUMMARY

The present application provides an obstacle-avoiding spraying method for a plant protection unmanned aerial vehicle. Based on a first unmanned aerial vehicle terminal, a second unmanned aerial vehicle terminal and a third unmanned aerial vehicle terminal which are located on a first unmanned aerial vehicle, a second unmanned aerial vehicle and a third unmanned aerial vehicle respectively, the method includes:

S101: the first unmanned aerial vehicle terminal controls the first unmanned aerial vehicle to fly at a preset first height along a preset first track and acquires a plurality of terrain pictures of the ground corresponding to the first track in real time during the flight;

S102: the first unmanned aerial vehicle terminal performs height identification processing on the plurality of terrain pictures by a preset terrain height identification method so as to acquire a specified terrain height corresponding to the plurality of terrain pictures;

S103: the first unmanned aerial vehicle terminal judges whether the specified terrain height is greater than a preset height threshold;

S104: if the specified terrain height is greater than the preset height threshold, the first unmanned aerial vehicle terminal inputs the plurality of terrain pictures into a preset scene type identification model for processing so as to acquire a first scene type which is output by the scene type identification model and corresponds to the plurality of terrain pictures, wherein the scene type identification model is trained by first training data based on a first convolutional neural network, the first training data being composed of a plurality of terrain pictures for training acquired in advance and a corresponding manually marked scene type;

S105: the first unmanned aerial vehicle terminal selects a specified magnetic plug-in corresponding to the specified scene type according to a mapping relationship between a preset scene type and the magnetic plug-in, wherein the magnetic plug-in is prestored on the first unmanned aerial vehicle, a magnetic field sealing device is preset on the magnetic plug-in, a first pattern painted by a first material is pre-drawn on a surface of the magnetic plug-in, a magnetic field intensity of the magnetic plug-in corresponds to the specified terrain height, and a control chip is preset on the magnetic plug-in and is able to receive a control signal to expose magnetism of the magnetic plug-in;

S106: the first unmanned aerial vehicle terminal uses a catapulting device preset on the first unmanned aerial vehicle to catapult the specified magnetic plug-in preset on the first unmanned aerial vehicle, such that the specified magnetic plug-in arrives at a specified area on the ground corresponding to the plurality of terrain pictures;

S201: after the first unmanned aerial vehicle takes off, the second unmanned aerial vehicle terminal controls the second unmanned aerial vehicle to fly at a second height along a second track, performs real-time spraying operations and adopts an optical sensor preset on the second unmanned aerial vehicle to perform signal acquisition on the ground corresponding to the second track, wherein the second height is lower than the first height, and the second track is parallel to the first track;

S202: the second unmanned aerial vehicle terminal judges whether a pattern presented by the signal acquired by the optical sensor is matched with the first pattern;

S203: if the pattern presented by the signal acquired by the optical sensor is matched with the first pattern, the second unmanned aerial vehicle terminal transmits a control signal to the specified magnetic plug-in to expose magnetism of the specified magnetic plug-in;

S204: the second unmanned aerial vehicle terminal uses a preset magnetic sensor on the second unmanned aerial vehicle to sense the magnetic field intensity of the specified magnetic plug-in, and acquires a specified bypass strategy corresponding to the magnetic field intensity of the specified magnetic plug-in according to a corresponding relationship between a preset magnetic field intensity and a bypass strategy;

S205: the second unmanned aerial vehicle terminal controls the second unmanned aerial vehicle to bypass an area corresponding to the plurality of terrain pictures according to the specified bypass strategy;

S301: after the second unmanned aerial vehicle takes off, the third unmanned aerial vehicle terminal controls the third unmanned aerial vehicle to fly at the second height along the second track, and adopts a preset magnetic sensor on the third unmanned aerial vehicle to perform magnetic field signal acquisition on the ground corresponding to the second track during the flight to acquire a magnetic field intensity;

S302: the third unmanned aerial vehicle terminal judges whether the acquired magnetic field intensity is greater than a preset intensity threshold; and S303: if the acquired magnetic field intensity is greater than the preset intensity threshold, the third unmanned aerial vehicle terminal determines that the specified magnetic plug-in is sensed and starts a plug-in recovery device on the third unmanned aerial vehicle, such that the specified magnetic plug-in is recovered to the third unmanned aerial vehicle.

Further, before the step S104: if the specified terrain height is greater than the preset height threshold, the first unmanned aerial vehicle terminal inputs the plurality of terrain pictures into a preset scene type identification model for processing so as to acquire a first scene type which is output by the scene type identification model and corresponds to the plurality of terrain pictures, wherein the scene type identification model is based on a first convolutional neural network and trained by first training data, the first training data being composed of a plurality of terrain pictures for training acquired in advance and a corresponding manually marked scene type, the method includes:

S1031: a plurality of terrain picture groups for training acquired in advance are retrieved and the plurality of terrain picture groups for training are divided into training data and verification data in proportion, wherein each of the plurality of terrain picture groups for training comprises a plurality of terrain pictures for training, all the pictures in each of the plurality of terrain picture groups for training are acquired by the unmanned aerial vehicle through image acquisition on the same ground, and each of the plurality of terrain picture groups for training is manually marked as a scene type;

S1032: the terrain picture groups for training in the training data are input into the preset first convolutional neural network for training by taking the group as a unit so as to acquire a temporal convolutional neural network model;

S1033: the temporal convolutional neural network model is verified by the terrain picture groups for training in the verification data to obtain a verification result and judge whether the verification result is pass or fail; and S1034: if the verification result is pass, the temporal convolutional neural network model is recorded as a scene type identification model.

Further, the step S105: the first unmanned aerial vehicle terminal selects a specified magnetic plug-in corresponding to the specified scene type according to a mapping relationship between a preset scene type and the magnetic plug-in, wherein the magnetic plug-in is prestored on the first unmanned aerial vehicle, a magnetic field sealing device is preset on the magnetic plug-in, a first pattern painted by a first material is pre-drawn on a surface of the magnetic plug-in, a magnetic field intensity of the magnetic plug-in corresponds to the specified terrain height, and a control chip is preset on the magnetic plug-in and is able to receive a control signal to expose magnetism of the magnetic plug-in includes:

S10501: the first unmanned aerial vehicle terminal inputs the plurality of terrain pictures into a preset terrain contour identification model for processing so as to acquire a first terrain contour output by the terrain contour identification model, wherein the terrain contour identification model is based on a second convolutional neural network and is trained by the first training data; and S10502: the first unmanned aerial vehicle terminal selects a specified magnetic plug-in corresponding to the specified scene type and the terrain contour according to a bivariate mapping relationship of the preset scene type, the terrain contour and the magnetic plug-in, wherein in the bivariate mapping relationship, the scene type is one variable, the terrain contour is the other variable and the magnetic plug-in is the mapping result, the magnetic plug-in is prestored on the first unmanned aerial vehicle, a magnetic field sealing device is preset on the magnetic plug-in, a first pattern painted by a first material is pre-drawn on a surface of the magnetic plug-in, a magnetic field intensity of the magnetic plug-in corresponds to the specified terrain height, and a control chip is preset on the magnetic plug-in and is able to receive a control signal to expose magnetism of the magnetic plug-in.

Further, a first pattern painted by an ultraviolet light absorbing material is pre-drawn on the surface of the specified magnetic plug-in, the area on the surface of the magnetic plug-in except for the area painted by the ultraviolet light absorbing material is painted by a second material, a color of the second material is as same as that of the ultraviolet light absorbing material, and the second material is not the ultraviolet light absorbing material; the preset optical sensor on the second unmanned aerial vehicle is an ultraviolet sensor; and the step S202: the second unmanned aerial vehicle terminal judges whether a pattern presented by the signal acquired by the optical sensor is matched with the first pattern includes:

S20201: the second unmanned aerial vehicle terminal performs contour extraction process on the pattern presented by the signal acquired by the optical sensor so as to extract a part where a signal intensity is weaker than a preset intensity threshold in the pattern presented by the signal acquired by the optical sensor to form a weak signal contour, S20202: the weak signal contour and the first pattern are subjected to nesting processing to obtain repeated area during the nesting processing, S20203: whether the repeated area is greater than a preset area threshold is judged, and S20204: if the repeated area is not greater than the preset area threshold, it is determined that the pattern presented by the signal acquired by the optical sensor is matched with the first pattern.

Further, the specified magnetic plug-in on the first unmanned aerial vehicle comprises an upper top surface, a lower bottom surface, n side surfaces and a magnetic core, the upper top surface being parallel to the lower bottom surface, the n side surfaces being connected to the upper top surface and the lower bottom surface respectively through n preset piezoelectric locks, each side surface having elasticity, the magnetic core being located in a space surrounded by the upper top surface, the lower bottom surface and the n side surfaces, the magnetic core being fixedly connected to the upper top surface through a non-metallic material and the magnetic core being fixedly connected to the lower bottom surface through a non-metallic material, and a non-metallic protective cover is arranged on the surface of the specified magnetic plug-in; the upper top surface, the lower bottom surface and the n side surfaces are all composed of a ferromagnetic material, the magnetic core is composed of a permanent magnetic material, the piezoelectric lock is made through electrostriction, the corresponding side surface is able to be separated from the upper top surface or the lower bottom surface when the piezoelectric lock receives an electrical signal, and the corresponding side surface keeps connecting to the upper top surface and the lower bottom surface when the piezoelectric lock does not receive an electrical signal; and the step S203: the second unmanned aerial vehicle terminal transmits a control signal to the specified magnetic plug-in to expose magnetism of the specified magnetic plug-in comprises:

S20301: the second unmanned aerial vehicle terminal transmits the control signal to the specified magnetic plug-in, such that the control chip in the specified magnetic plug-in acquires the control signal, S20302: the control chip in the specified magnetic plug-in transmits an electrical signal for starting to the n piezoelectric locks according to the control signal, and S20303: the n piezoelectric locks receive the electrical signal for starting, and an electrostriction phenomenon occurs according to the electrical signal for starting, such that the n side surfaces are separated from the upper top surface or the lower bottom surface and the magnetism of the specified magnetic plug-in is exposed.

The present application provides an obstacle-avoiding spraying device for a plant protection unmanned aerial vehicle. Based on a first unmanned aerial vehicle terminal, a second unmanned aerial vehicle terminal and a third unmanned aerial vehicle terminal which are located on a first unmanned aerial vehicle, a second unmanned aerial vehicle and a third unmanned aerial vehicle respectively, the device includes:

a first flying unit, used for the first unmanned aerial vehicle terminal to control the first unmanned aerial vehicle to fly at a preset first height along a preset first track and acquires a plurality of terrain pictures of the ground corresponding to the first track in real time during the flight;

a terrain height identification unit, used for the first unmanned aerial vehicle terminal to perform height identification processing on the plurality of terrain pictures by a preset terrain height identification method so as to acquire a specified terrain height corresponding to the plurality of terrain pictures;

a height threshold judgment unit, used for the first unmanned aerial vehicle terminal to judge whether the specified terrain height is greater than a preset height threshold;

a first scene type acquisition unit, used for, if the specified terrain height is greater than the preset height threshold, the first unmanned aerial vehicle terminal to input the plurality of terrain pictures into a preset scene type identification model for processing so as to acquire a first scene type which is output by the scene type identification model and corresponds to the plurality of terrain pictures, wherein the scene type identification model is trained by first training data based on a first convolutional neural network, the first training data being composed of a plurality of terrain pictures for training acquired in advance and a corresponding manually marked scene type;

a specified magnetic plug-in acquisition unit, used for the first unmanned aerial vehicle terminal to select a specified magnetic plug-in corresponding to the specified scene type according to a mapping relationship between a preset scene type and the magnetic plug-in, wherein the magnetic plug-in is prestored on the first unmanned aerial vehicle, a magnetic field sealing device is preset on the magnetic plug-in, a first pattern painted by a first material is pre-drawn on a surface of the magnetic plug-in, a magnetic field intensity of the magnetic plug-in corresponds to the specified terrain height, and a control chip is preset on the magnetic plug-in and is able to receive a control signal to expose magnetism of the magnetic plug-in;

a catapulting unit, used for the first unmanned aerial vehicle terminal to use a catapulting device preset on the first unmanned aerial vehicle to catapult the specified magnetic plug-in preset on the first unmanned aerial vehicle, such that the specified magnetic plug-in arrives at a specified area on the ground corresponding to the plurality of terrain pictures;

a signal acquisition unit, used for, after the first unmanned aerial vehicle takes off, the second unmanned aerial vehicle terminal to control the second unmanned aerial vehicle to fly at a second height along a second track, perform real-time spraying operations and adopt an optical sensor preset on the second unmanned aerial vehicle to perform signal acquisition on the ground corresponding to the second track, wherein the second height is lower than the first height, and the second track is parallel to the first track;

a pattern matching judgment unit, used for the second unmanned aerial vehicle terminal to judge whether a pattern presented by the signal acquired by the optical sensor is matched with the first pattern;

a control signal transmitting unit, used for, if the pattern presented by the signal acquired by the optical sensor is matched with the first pattern, the second unmanned aerial vehicle terminal to transmit a control signal to the specified magnetic plug-in to expose magnetism of the specified magnetic plug-in;

a specified bypass strategy acquisition unit, used for the second unmanned aerial vehicle terminal to use a preset magnetic sensor on the second unmanned aerial vehicle to sense the magnetic field intensity of the specified magnetic plug-in, and acquires a specified bypass strategy corresponding to the magnetic field intensity of the specified magnetic plug-in according to a corresponding relationship between a preset magnetic field intensity and a bypass strategy;

a bypass unit, used for the second unmanned aerial vehicle terminal to control the second unmanned aerial vehicle to bypass an area corresponding to the plurality of terrain pictures according to the specified bypass strategy;

a magnetic field intensity acquisition unit, used for, after the second unmanned aerial vehicle takes off, the third unmanned aerial vehicle terminal to control the third unmanned aerial vehicle to fly at the second height along the second track, and adopt a preset magnetic sensor on the third unmanned aerial vehicle to perform magnetic field signal acquisition on the ground corresponding to the second track during the flight to acquire a magnetic field intensity;

a magnetic field judgment unit, used for the third unmanned aerial vehicle terminal to judge whether the acquired magnetic field intensity is greater than a preset intensity threshold; and a specified magnetic plug-in recovery unit, used for, if the acquired magnetic field intensity is greater than the preset intensity threshold, the third unmanned aerial vehicle terminal to determine that the specified magnetic plug-in is sensed and starts a plug-in recovery device on the third unmanned aerial vehicle, such that the specified magnetic plug-in is recovered to the third unmanned aerial vehicle.

The present application provides a computer device. The computer device includes a memory and a processor, wherein the memory stores a computer program, and the processor implements the steps of any one of the above methods when executing the computer program.

The present application provides a computer readable storage medium. A computer program is stored in the computer readable storage medium and enables the processor to implement the steps of any one of the above methods when being executed by the processor.

According to the obstacle-avoiding spraying method and device for the plant protection unmanned aerial vehicle, the computer device and the storage medium of the present application, through special designs, the plant protection unmanned aerial vehicle is capable of avoiding obstacles for spraying operation, and the efficiency of the spraying operations is improved on the premise of preventing from blockage of the obstacles. It should be noted that the obstacle-avoiding spraying method for the plant protection unmanned aerial vehicle of the present application needs to be implemented jointly by three unmanned aerial vehicles, but the special part is that it is unnecessary for unmanned aerial vehicle terminals corresponding to the three unmanned aerial vehicles to communicate and interact with each other, such that the method has a wider application range and is easier to implement. Moreover, the present application adopts many special designs to ensure the plant protection unmanned aerial vehicle to perform efficient obstacle-avoiding spraying.

The implementation of objectives, functional characteristics, and advantages of the present application will be further described with reference to the accompanying drawings.

DETAILED DESCRIPTION OF THE EMBODIMENTS

To make the objectives, technical solutions, and advantages of the present application clearer, the present application is further described below in detail with reference to the accompanying drawings and embodiments. It should be understood that the specific embodiments described herein are only for explaining the present application, rather than for limiting the present application. In the present application, a plurality means more than two.

According to the present application, through special designs, the plant protection unmanned aerial vehicle (refers to a second unmanned aerial vehicle in the present application, that is, the second unmanned aerial vehicle is provided with a spraying mechanism) is capable of avoiding obstacles for spraying operation, and the efficiency of the spraying operations is improved on the premise of preventing from blockage of the obstacles. It should be noted that the obstacle-avoiding spraying method for the plant protection unmanned aerial vehicle of the present application needs to be implemented jointly by three unmanned aerial vehicles, but the special part is that it is unnecessary for unmanned aerial vehicle terminals corresponding to the three unmanned aerial vehicles to communicate and interact with each other, such that the method has a wider application range and is easier to implement. Moreover, the present application adopts many special designs to ensure the plant protection unmanned aerial vehicle to perform efficient obstacle-avoiding spraying. There are many contents involved, which are thus explained one by one below with reference to the specific steps.

Figure 1:
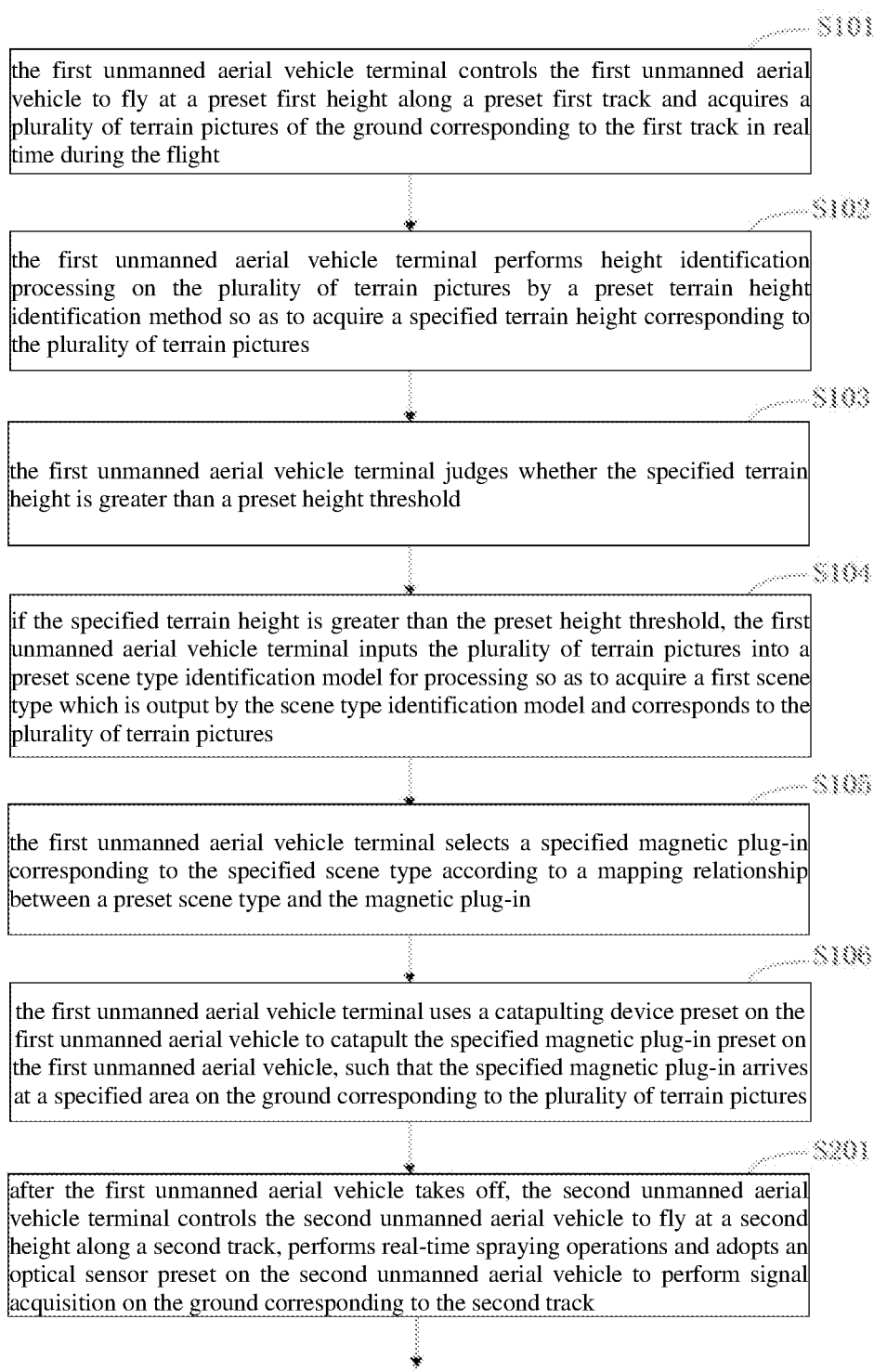
FIG. 1 and FIG. 2 are schematic flowcharts of an obstacle-avoiding spraying method for an plant protection unmanned aerial vehicle according to an embodiment of the present application.
Figure 2:
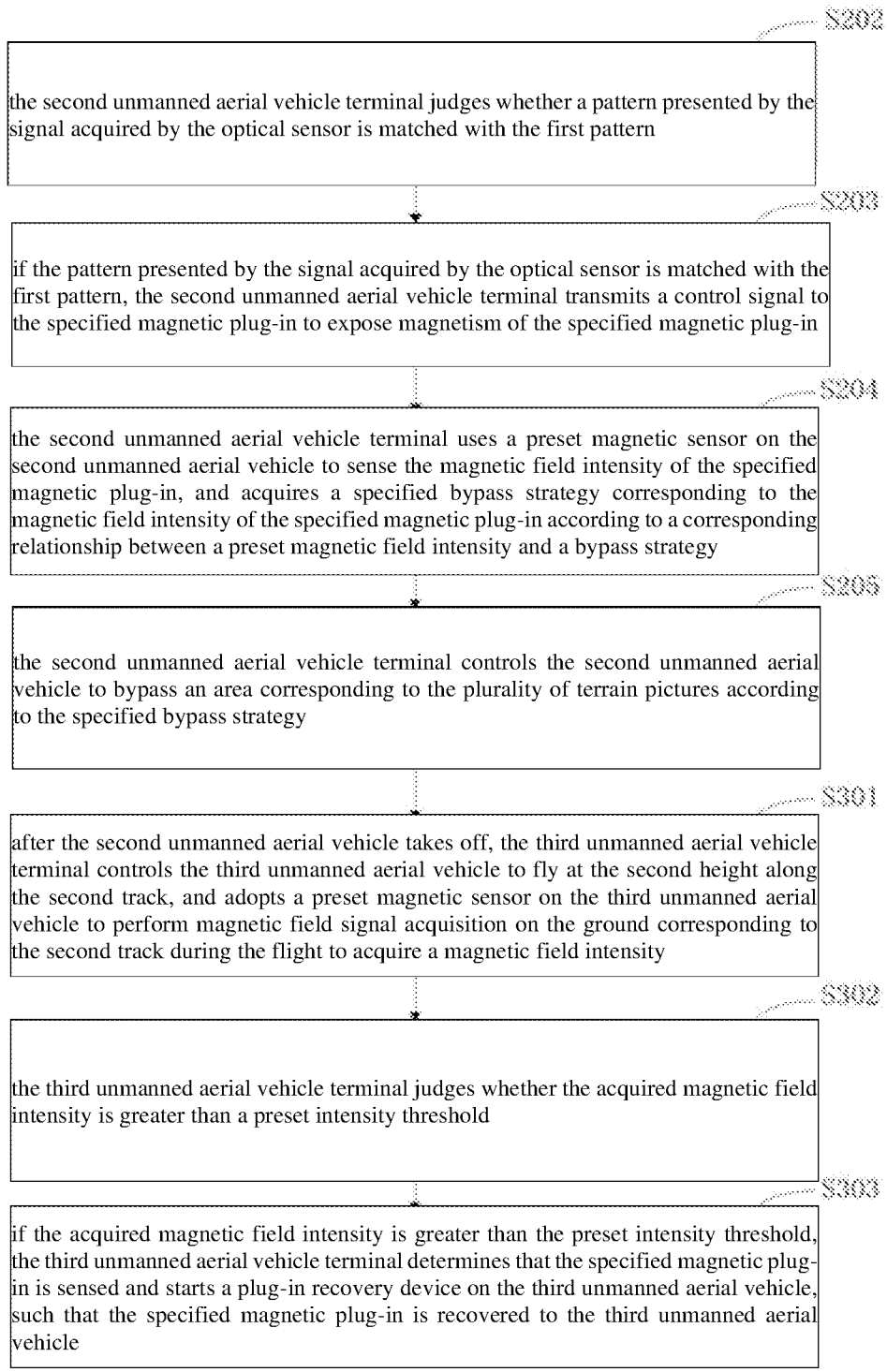
Figure 3:
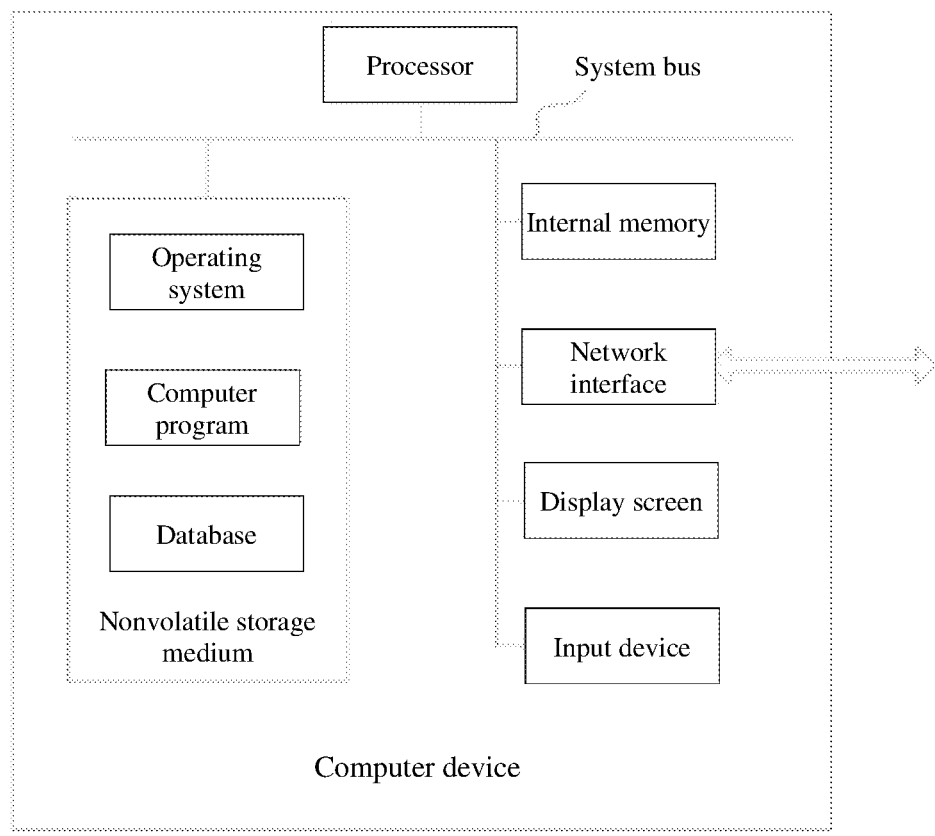
FIG. 3 is a structural schematic block diagram of a computer device according to an embodiment of the present application.

Referring to FIG. 1 to FIG. 2, the embodiment of the present application provides an obstacle-avoiding spraying method for a plant protection unmanned aerial vehicle. Based on a first unmanned aerial vehicle terminal, a second unmanned aerial vehicle terminal and a third unmanned aerial vehicle terminal which are located on a first unmanned aerial vehicle, a second unmanned aerial vehicle and a third unmanned aerial vehicle respectively, the method includes:

S101: the first unmanned aerial vehicle terminal controls the first unmanned aerial vehicle to fly at a preset first height along a preset first track and acquires a plurality of terrain pictures of the ground corresponding to the first track in real time during the flight;

S102: the first unmanned aerial vehicle terminal performs height identification processing on the plurality of terrain pictures by a preset terrain height identification method so as to acquire a specified terrain height corresponding to the plurality of terrain pictures;

S103: the first unmanned aerial vehicle terminal judges whether the specified terrain height is greater than a preset height threshold;

S104: if the specified terrain height is greater than the preset height threshold, the first unmanned aerial vehicle terminal inputs the plurality of terrain pictures into a preset scene type identification model for processing so as to acquire a first scene type which is output by the scene type identification model and corresponds to the plurality of terrain pictures, wherein the scene type identification model is trained by first training data based on a first convolutional neural network, the first training data being composed of a plurality of terrain pictures for training acquired in advance and a corresponding manually marked scene type;

S105: the first unmanned aerial vehicle terminal selects a specified magnetic plug-in corresponding to the specified scene type according to a mapping relationship between a preset scene type and the magnetic plug-in, wherein the magnetic plug-in is prestored on the first unmanned aerial vehicle, a magnetic field sealing device is preset on the magnetic plug-in, a first pattern painted by a first material is pre-drawn on a surface of the magnetic plug-in, a magnetic field intensity of the magnetic plug-in corresponds to the specified terrain height, and a control chip is preset on the magnetic plug-in and is able to receive a control signal to expose magnetism of the magnetic plug-in;

S106: the first unmanned aerial vehicle terminal uses a catapulting device preset on the first unmanned aerial vehicle to catapult the specified magnetic plug-in preset on the first unmanned aerial vehicle, such that the specified magnetic plug-in arrives at a specified area on the ground corresponding to the plurality of terrain pictures;

S201: after the first unmanned aerial vehicle takes off, the second unmanned aerial vehicle terminal controls the second unmanned aerial vehicle to fly at a second height along a second track, performs real-time spraying operations and adopts an optical sensor preset on the second unmanned aerial vehicle to perform signal acquisition on the ground corresponding to the second track, wherein the second height is lower than the first height, and the second track is parallel to the first track;

S202: the second unmanned aerial vehicle terminal judges whether a pattern presented by the signal acquired by the optical sensor is matched with the first pattern;

S203: if the pattern presented by the signal acquired by the optical sensor is matched with the first pattern, the second unmanned aerial vehicle terminal transmits a control signal to the specified magnetic plug-in to expose magnetism of the specified magnetic plug-in;

S204: the second unmanned aerial vehicle terminal uses a preset magnetic sensor on the second unmanned aerial vehicle to sense the magnetic field intensity of the specified magnetic plug-in, and acquires a specified bypass strategy corresponding to the magnetic field intensity of the specified magnetic plug-in according to a corresponding relationship between a preset magnetic field intensity and a bypass strategy;

S205: the second unmanned aerial vehicle terminal controls the second unmanned aerial vehicle to bypass an area corresponding to the plurality of terrain pictures according to the specified bypass strategy;

S301: after the second unmanned aerial vehicle takes off, the third unmanned aerial vehicle terminal controls the third unmanned aerial vehicle to fly at the second height along the second track, and adopts a preset magnetic sensor on the third unmanned aerial vehicle to perform magnetic field signal acquisition on the ground corresponding to the second track during the flight to acquire a magnetic field intensity;

S302: the third unmanned aerial vehicle terminal judges whether the acquired magnetic field intensity is greater than a preset intensity threshold; and S303: if the acquired magnetic field intensity is greater than the preset intensity threshold, the third unmanned aerial vehicle terminal determines that the specified magnetic plug-in is sensed and starts a plug-in recovery device on the third unmanned aerial vehicle, such that the specified magnetic plug-in is recovered to the third unmanned aerial vehicle.

As described in the steps S101-S103, the first unmanned aerial vehicle terminal controls the first unmanned aerial vehicle to fly at the preset first height along the first track and acquires the plurality of terrain pictures of the ground corresponding to the first track in real time during the flight; the first unmanned aerial vehicle terminal performs height identification processing on the plurality of terrain pictures by the preset terrain height identification method so as to acquire the specified terrain height corresponding to the plurality of terrain pictures; and the first unmanned aerial vehicle terminal judges whether the specified terrain height is greater than the preset height threshold. It should be mentioned here that the obstacle-avoiding spraying method for the plant protection unmanned aerial vehicle according to the present application is divided into three stages which are respectively implemented by three unmanned aerial vehicle terminals as implementation main bodies. The preset first height is larger because the purpose of the first unmanned aerial vehicle is to identify obstacles with larger heights. The obstacles may be any feasible obstacles, such as protruded rocks, telegraph poles, protruded trees, etc. In addition, according to the present application, it is necessary to acquire a plurality of terrain pictures, that is, it is necessary to acquire a plurality of terrain pictures for the same ground. This is because it is difficult to perform three-dimensional analysis on single picture, resulting inaccurate identification of the terrain height. According to the present application, a plurality of terrain pictures are acquired in real time for the same ground, and the plurality of terrain pictures are shot in the flight process of the first unmanned aerial vehicle, so the shooting positions are different, that is, a plurality of terrain pictures are shot for the same ground at different angles in high altitude, and the accuracy of the identified terrain height is higher. The terrain height identification method may adopt any feasible method, for example, whether there is an obstacle is detected by a binocular vision technology (due to the plurality of terrain pictures, the binocular vision technology may be adopted), and the parallax result is obtained by three-dimensional matching and other steps, such that the size and position of the obstacle are calculated, thereby obtaining a height of the obstacle. The first unmanned aerial vehicle terminal judges whether the specified terrain height is greater than a preset height threshold so as to judge whether the ground corresponding to the specified terrain height is an obstacle. The height threshold, for example, is a flight height of the subsequent second unmanned aerial vehicle.

As described in the steps S104-S106, if the specified terrain height is greater than the preset height threshold, the first unmanned aerial vehicle terminal inputs the plurality of terrain pictures into the preset scene type identification model for processing so as to acquire the first scene type which is output by the scene type identification model and corresponds to the plurality of terrain pictures, wherein the scene type identification model is based on the first convolutional neural network and trained by first training data, the first training data being composed of a plurality of terrain pictures for training acquired in advance and a corresponding manually marked scene type; the first unmanned aerial vehicle terminal selects the specified magnetic plug-in corresponding to the specified scene type according to a mapping relationship between the preset scene type and the magnetic plug-in, wherein the magnetic plug-in is prestored on the first unmanned aerial vehicle, the magnetic field sealing device is preset on the magnetic plug-in, the first pattern painted by a first material is pre-drawn on a surface of the magnetic plug-in, the magnetic field intensity of the magnetic plug-in corresponding to the specified terrain height, and the control chip is preset on the magnetic plug-in and is able to receive a control signal to expose magnetism of the magnetic plug-in; and the first unmanned aerial vehicle terminal uses the catapulting device preset on the first unmanned aerial vehicle to catapult the specified magnetic plug-in preset on the first unmanned aerial vehicle, such that the specified magnetic plug-in arrives at the specified area on the ground corresponding to the plurality of terrain pictures. If the specified terrain height is greater than the preset height threshold, it indicates that there is an obstacle. Then, the first unmanned aerial vehicle terminal inputs the plurality of terrain pictures into the preset scene type identification model for processing so as to acquire the first scene type which is output by the scene type identification model and corresponds to the plurality of terrain pictures. It should be noted that the present application must perform scene type identification because the specific magnetic plug-in in the present application can be ejected to different positions according to different obstacles. For example, when the obstacle is the protruded earth mound, the specified magnetic plug-in is ejected to the center of the earth mound; however, if the obstacle is the telegraph pole, it is impossible to eject the specific magnetic plug-in to the center of the telegraph pole, and at this time, the specified magnetic plug-in may be ejected to a preset distance from the telegraph pole (of course, it is necessary for the second unmanned aerial vehicle to identify in time). Since the scene type identification model is trained by first training data based on a first convolutional neural network and the first training data is composed of a plurality of terrain pictures for training acquired in advance and a corresponding manually marked scene type, the scene type identification model can be competent for scene type identification tasks. The first unmanned aerial vehicle terminal selects a specified magnetic plug-in corresponding to the specified scene type according to a mapping relationship between a preset scene type and the magnetic plug-in, wherein the magnetic plug-in is prestored on the first unmanned aerial vehicle, a magnetic field sealing device is preset on the magnetic plug-in, a first pattern painted by a first material is pre-drawn on a surface of the magnetic plug-in, and a magnetic field intensity of the magnetic plug-in corresponds to the specified terrain height, such that the specified magnetic plug-in is relevant to the scene type and relevant to the terrain height. Therefore, when the second unmanned aerial vehicle identifies the specified magnetic plug-in, that is, the second unmanned aerial can know the detailed information of the obstacle so as to make corresponding obstacle-avoiding operations (for example, if the obstacle is the telegraph pole, it is better to adopt plane bypass; and if the obstacle is the rock with smaller height and wider range, it is better to adopt above bypass). In addition, although the magnetic plug-in is mentioned in the present application, the magnetic plug-in is only a name and may be called a magnetic part. It should be noted that in the present application, the magnetic plug-in is very special and the special points are as follows: the magnetic plug-in has magnetism corresponding to the terrain (that is, the specified magnetic plug-in is relevant to the scene type and is relevant to the specified terrain height); a magnetic field sealing device is preset on the magnetic plug-in, so the magnetic plug-in is magnetically converged under the default state and will not affect or be affected by the outside; and a first pattern painted by a first material is pre-drawn on the surface of the magnetic plug-in, and the first pattern can be provided to the second unmanned aerial vehicle for rapid identification. The magnetic plug-in is also provided with a battery for any parts in the magnetic plug-in that needs current (such as a control chip). Or the magnetic plug-in is not provided with a battery. Current required by operation of the control chip in the magnetic plug-in is provided by laser with an specified wavelength emitted by the second unmanned aerial vehicle (that is, a photoelectric generation device capable of absorbing the specified wavelength is preset on the magnetic plug-in, such that the current is obtained). Through the design, the magnetic plug-in does not need an additional battery. Moreover, the second unmanned aerial vehicle may provide a control signal (a control current signal is acquired by irradiating the laser with the specified wavelength to the preset photoelectric generation device on the magnetic plug-in) and energy only by emitting the laser with the specified wavelength, thus improving efficiency.

Further, before the step S104: if the specified terrain height is greater than the preset height threshold, the first unmanned aerial vehicle terminal inputs the plurality of terrain pictures into a preset scene type identification model for processing so as to acquire a first scene type which is output by the scene type identification model and corresponds to the plurality of terrain pictures, wherein the scene type identification model is based on a first convolutional neural network and trained by first training data, the first training data being composed of a plurality of terrain pictures for training acquired in advance and a corresponding manually marked scene type, the method includes:

S1031: a plurality of terrain picture groups for training acquired in advance are retrieved and the plurality of terrain picture groups for training are divided into training data and verification data in proportion, wherein each of the plurality of terrain picture groups for training comprises a plurality of terrain pictures for training, all the pictures in each of the plurality of terrain picture groups for training being acquired by the unmanned aerial vehicle through image acquisition on the same ground, and each of the plurality of terrain picture groups for training being manually marked as a scene type;

S1032: the terrain picture groups for training in the training data are input into the preset first convolutional neural network for training by taking the group as a unit so as to acquire a temporal convolutional neural network model;

S1033: the temporal convolutional neural network model is verified by the terrain picture groups for training in the verification data to obtain a verification result and judge whether the verification result is pass or fail; and S1034: if the verification result is pass, the temporal convolutional neural network model is recorded as a scene type identification model.

Therefore, the scene type identification model can be competent for a picture identification task which takes a plurality of terrain pictures as input for predicting the scene type. The proportion is, for example, 9:1.

Further, the step S105: the first unmanned aerial vehicle terminal selects a specified magnetic plug-in corresponding to the specified scene type according to a mapping relationship between a preset scene type and the magnetic plug-in, wherein the magnetic plug-in is prestored on the first unmanned aerial vehicle, a magnetic field sealing device is preset on the magnetic plug-in, a first pattern painted by a first material is pre-drawn on a surface of the magnetic plug-in, a magnetic field intensity of the magnetic plug-in corresponds to the specified terrain height, and a control chip is preset on the magnetic plug-in and is able to receive a control signal to expose magnetism of the magnetic plug-in includes:

S10501: the first unmanned aerial vehicle terminal inputs the plurality of terrain pictures into a preset terrain contour identification model for processing so as to acquire a first terrain contour output by the terrain contour identification model, wherein the terrain contour identification model is based on a second convolutional neural network and is trained by the first training data; and S10502: the first unmanned aerial vehicle terminal selects a specified magnetic plug-in corresponding to the specified scene type and the terrain contour according to a bivariate mapping relationship of the preset scene type, the terrain contour and the magnetic plug-in, wherein in the bivariate mapping relationship, the scene type is one variable, the terrain contour is the other variable and the magnetic plug-in is the mapping result, the magnetic plug-in is prestored on the first unmanned aerial vehicle, a magnetic field sealing device is preset on the magnetic plug-in, a first pattern painted by a first material is pre-drawn on a surface of the magnetic plug-in, a magnetic field intensity of the magnetic plug-in corresponds to the specified terrain height, and a control chip is preset on the magnetic plug-in and is able to receive a control signal to expose magnetism of the magnetic plug-in.

Therefore, the magnetic plug-in not only reflects the scene type, but also reflects the terrain contour, thus providing more accurate and appropriate basis for the bypass strategy of the subsequent second unmanned aerial vehicle.

As described in the steps S201-S205, after the first unmanned aerial vehicle takes off, the second unmanned aerial vehicle terminal controls the second unmanned aerial vehicle to fly at the second height along the second track, performs real-time spraying operations and adopts an optical sensor preset on the second unmanned aerial vehicle to perform signal acquisition on the ground corresponding to the second track, wherein the second height is lower than the first height, and the second track is parallel to the first track; the second unmanned aerial vehicle terminal judges whether the pattern presented by the signal acquired by the optical sensor is matched with the first pattern; if the pattern presented by the signal acquired by the optical sensor is matched with the first pattern, the second unmanned aerial vehicle terminal transmits the control signal to the specified magnetic plug-in to expose magnetism of the specified magnetic plug-in; the second unmanned aerial vehicle terminal uses the preset magnetic sensor on the second unmanned aerial vehicle to sense the magnetic field intensity of the specified magnetic plug-in, and acquires the specified bypass strategy corresponding to the magnetic field intensity of the specified magnetic plug-in according to the corresponding relationship between a preset magnetic field intensity and a bypass strategy; and the second unmanned aerial vehicle terminal controls the second unmanned aerial vehicle to bypass an area corresponding to the plurality of terrain pictures according to the specified bypass strategy. It should be noted that since the first unmanned aerial vehicle does not perform spraying operation, the flight speed of the first unmanned aerial vehicle is greater than that of the second unmanned aerial vehicle, such that after the first unmanned aerial vehicle takes off, the second unmanned aerial vehicle may fly at the second height along the second track and perform real-time spraying operation, wherein the second height is lower than the first height, that is, the second unmanned aerial vehicle flies close to the ground. Moreover, during flight, the ground corresponding to the second track is subjected to signal acquisition by the preset optical sensor on the second unmanned aerial vehicle to determine the position of the magnetic plug-in, such that the detailed information of the obstacle is determined on the premise of not establishing communication connection with the first unmanned aerial vehicle terminal. The second unmanned aerial vehicle terminal judges whether a pattern presented by the signal acquired by the optical sensor is matched with the first pattern; and if the pattern presented by the signal acquired by the optical sensor is matched with the first pattern, it indicates that the specified magnetic plug-in is obtained. The second unmanned aerial vehicle terminal transmits the control signal to the specified magnetic plug-in, thus exposing magnetism on the specified magnetic plug-in.

Further, a first pattern painted by an ultraviolet light absorbing material is pre-drawn on the surface of the specified magnetic plug-in, the area on the surface of the magnetic plug-in except for the area painted by the ultraviolet light absorbing material is painted by a second material, a color of the second material is as same as that of the ultraviolet light absorbing material, and the second material is not the ultraviolet light absorbing material; the preset optical sensor on the second unmanned aerial vehicle is an ultraviolet sensor; and the step S202: the second unmanned aerial vehicle terminal judges whether a pattern presented by the signal acquired by the optical sensor is matched with the first pattern includes:

S20201: the second unmanned aerial vehicle terminal performs contour extraction process on the pattern presented by the signal acquired by the optical sensor so as to extract a part where a signal intensity is weaker than a preset intensity threshold in the pattern presented by the signal acquired by the optical sensor to form a weak signal contour, S20202: the weak signal contour and the first pattern are subjected to nesting processing to obtain repeated area during the nesting processing, S20203: whether the repeated area is greater than a preset area threshold is judged, and S20204: if the repeated area is not greater than the preset area threshold, it is determined that the pattern presented by the signal acquired by the optical sensor is matched with the first pattern.

Therefore, according to the present application, the color interference to the outside is reduced and the interference of the outside color to the signal acquisition result is reduced, such that calculation pressure is reduced and the efficiency of identifying the specified magnetic plug-in is improved.

Further, the specified magnetic plug-in on the first unmanned aerial vehicle comprises an upper top surface, a lower bottom surface, n side surfaces and a magnetic core, the upper top surface being parallel to the lower bottom surface, the n side surfaces being connected to the upper top surface and the lower bottom surface respectively through n preset piezoelectric locks, each side surface having elasticity, the magnetic core being located in a space surrounded by the upper top surface, the lower bottom surface and the n side surfaces, the magnetic core being fixedly connected to the upper top surface through a non-metallic material and the magnetic core being fixedly connected to the lower bottom surface through a non-metallic material, and a non-metallic protective cover is arranged on the surface of the specified magnetic plug-in; the upper top surface, the lower bottom surface and the n side surfaces are all composed of a ferromagnetic material, the magnetic core is composed of a permanent magnetic material, the piezoelectric lock is made through electrostriction, the corresponding side surface is able to be separated from the upper top surface or the lower bottom surface when the piezoelectric lock receives an electrical signal, and the corresponding side surface keeps connecting to the upper top surface and the lower bottom surface when the piezoelectric lock does not receive an electrical signal; and the step S203: the second unmanned aerial vehicle terminal transmits a control signal to the specified magnetic plug-in to expose magnetism of the specified magnetic plug-in comprises:

S20301: the second unmanned aerial vehicle terminal transmits the control signal to the specified magnetic plug-in, such that the control chip in the specified magnetic plug-in acquires the control signal, S20302: the control chip in the specified magnetic plug-in transmits an electrical signal for starting to the n piezoelectric locks according to the control signal, and S20303: the n piezoelectric locks receive the electrical signal for starting, and an electrostriction phenomenon occurs according to the electrical signal for starting, such that the n side surfaces are separated from the upper top surface or the lower bottom surface and the magnetism of the specified magnetic plug-in is exposed.

Therefore, the interference between the magnetism of the specified magnetic plug-in and the outside is reduced and the magnetic detection is more accurate, thus ensuring the accuracy of determining the bypass strategy. The specified magnetic plug-in in the present application adopts a special structure, that is, the specified magnetic plug-in includes an upper top surface, a lower bottom surface, n side surfaces and a magnetic core, the upper top surface being parallel to the lower bottom surface, the n side surfaces being connected to the upper top surface and the lower bottom surface respectively through n preset piezoelectric locks, each side surface having elasticity, the magnetic core being located in a space surrounded by the upper top surface, the lower bottom surface and the n side surfaces, the magnetic core being fixedly connected to the upper top surface through a non-metallic material and the magnetic core being fixedly connected to the lower bottom surface through a non-metallic material, and a non-metallic protective cover is arranged on the surface of the specified magnetic plug-in; the upper top surface, the lower bottom surface and the n side surfaces are all composed of a ferromagnetic material, the magnetic core is composed of a permanent magnetic material, the piezoelectric lock is made through electrostriction, the corresponding side surface is able to be separated from the upper top surface or the lower bottom surface when the piezoelectric lock receives an electrical signal, and the corresponding side surface keeps connecting to the upper top surface and the lower bottom surface when the piezoelectric lock does not receive an electrical signal. The side surface, for example, is a ferromagnetic metal spring such as a square ferromagnetic metal spring, or is a metal elastic strip. The magnetic core is, for example, a permanent magnet, such as neodymium iron boron. The piezoelectric lock is in an extended state when not receiving the electric signal, such that the extended portion connects the side surfaces with the upper top surface or the lower bottom surface (for example, through clamping hole design); and the piezoelectric lock is in a compressed state with receiving the electrical signal, such that the extended portion shrinks and the side surfaces are separated from the upper top surface or the lower bottom surface, thus exposing the magnetism of the specified magnetic plug-in.

As described in the steps S301-S303, after the second unmanned aerial vehicle takes off, the third unmanned aerial vehicle terminal controls the third unmanned aerial vehicle to fly at the second height along the second track, and adopts the preset magnetic sensor on the third unmanned aerial vehicle to perform magnetic field signal acquisition on the ground corresponding to the second track during the flight to acquire the magnetic field intensity; the third unmanned aerial vehicle terminal judges whether the acquired magnetic field intensity is greater than the preset intensity threshold; and if the acquired magnetic field intensity is greater than the preset intensity threshold, the third unmanned aerial vehicle terminal determines that the specified magnetic plug-in is sensed and starts the plug-in recovery device on the third unmanned aerial vehicle, such that the specified magnetic plug-in is recovered to the third unmanned aerial vehicle. The function of the third unmanned aerial vehicle is to recover the magnetic plug-in, so the third unmanned aerial vehicle flies at the second height along the second track. Moreover, the third unmanned aerial vehicle does not need to perform terrain identification like the first unmanned aerial vehicle and also does not need to perform pattern identification like the second unmanned aerial vehicle, and only needs to perform magnetic field intensity identification to obtain the accurate position of the specified magnetic plug-in. That is, the ground corresponding to the second track is subjected to magnetic field signal acquisition by the preset magnetic sensor on the third unmanned aerial vehicle to acquire the magnetic field intensity; the third unmanned aerial vehicle terminal judges whether the acquired magnetic field intensity is greater than a preset intensity threshold; and if the acquired magnetic field intensity is greater than a preset intensity threshold, the third unmanned aerial vehicle terminal determines that the specified magnetic plug-in is sensed. The plug-in recovery device may be any feasible device, for example, a mechanical arm or a magnetic field generation device, preferably, a directional magnetic field generation device. When the plug-in recovery device is the directional magnetic field generation device, the specified magnetic plug-in can be sucked back by controlling the density of the generated magnetic induction lines (for example, by designing an electromagnetic coil and supplemented by a magnetic field interference component).

According to the obstacle-avoiding spraying method for the plant protection unmanned aerial vehicle of the present application, through special designs, the plant protection unmanned aerial vehicle is capable of avoiding obstacles for spraying operation, and the efficiency of the spraying operations is improved on the premise of preventing from blockage of the obstacles. It should be noted that the obstacle-avoiding spraying method for the plant protection unmanned aerial vehicle of the present application needs to be implemented jointly by three unmanned aerial vehicles, but the special part is that it is unnecessary for unmanned aerial vehicle terminals corresponding to the three unmanned aerial vehicles to communicate and interact with each other, such that the method has a wider application range and is easier to implement. Moreover, the present application adopts many special designs to ensure the plant protection unmanned aerial vehicle to perform efficient obstacle-avoiding spraying.

The embodiment of the present application provides an obstacle-avoiding spraying device for a plant protection unmanned aerial vehicle. Based on a first unmanned aerial vehicle terminal, a second unmanned aerial vehicle terminal and a third unmanned aerial vehicle terminal which are located on a first unmanned aerial vehicle, a second unmanned aerial vehicle and a third unmanned aerial vehicle respectively, the device includes:

a first flying unit, used for the first unmanned aerial vehicle terminal to control the first unmanned aerial vehicle to fly at a preset first height along a preset first track and acquires a plurality of terrain pictures of the ground corresponding to the first track in real time during the flight;

a terrain height identification unit, used for the first unmanned aerial vehicle terminal to perform height identification processing on the plurality of terrain pictures by a preset terrain height identification method so as to acquire a specified terrain height corresponding to the plurality of terrain pictures;

a height threshold judgment unit, used for the first unmanned aerial vehicle terminal to judge whether the specified terrain height is greater than a preset height threshold;

a first scene type acquisition unit, used for, if the specified terrain height is greater than the preset height threshold, the first unmanned aerial vehicle terminal to input the plurality of terrain pictures into a preset scene type identification model for processing so as to acquire a first scene type which is output by the scene type identification model and corresponds to the plurality of terrain pictures, wherein the scene type identification model is trained by first training data based on a first convolutional neural network, the first training data being composed of a plurality of terrain pictures for training acquired in advance and a corresponding manually marked scene type;

a specified magnetic plug-in acquisition unit, used for the first unmanned aerial vehicle terminal to select a specified magnetic plug-in corresponding to the specified scene type according to a mapping relationship between a preset scene type and the magnetic plug-in, wherein the magnetic plug-in is prestored on the first unmanned aerial vehicle, a magnetic field sealing device is preset on the magnetic plug-in, a first pattern painted by a first material is pre-drawn on a surface of the magnetic plug-in, a magnetic field intensity of the magnetic plug-in corresponding to the specified terrain height, and a control chip is preset on the magnetic plug-in and is able to receive a control signal to expose magnetism of the magnetic plug-in;

a catapulting unit, used for the first unmanned aerial vehicle terminal to use a catapulting device preset on the first unmanned aerial vehicle to catapult the specified magnetic plug-in preset on the first unmanned aerial vehicle, such that the specified magnetic plug-in arrives at a specified area on the ground corresponding to the plurality of terrain pictures;

a signal acquisition unit, used for, after the first unmanned aerial vehicle takes off, the second unmanned aerial vehicle terminal to control the second unmanned aerial vehicle to fly at a second height along a second track, perform real-time spraying operations and adopt an optical sensor preset on the second unmanned aerial vehicle to perform signal acquisition on the ground corresponding to the second track, wherein the second height is lower than the first height, and the second track is parallel to the first track;

a pattern matching judgment unit, used for the second unmanned aerial vehicle terminal to judge whether a pattern presented by the signal acquired by the optical sensor is matched with the first pattern;

a control signal transmitting unit, used for, if the pattern presented by the signal acquired by the optical sensor is matched with the first pattern, the second unmanned aerial vehicle terminal to transmit a control signal to the specified magnetic plug-in to expose magnetism of the specified magnetic plug-in;

a specified bypass strategy acquisition unit, used for the second unmanned aerial vehicle terminal to use a preset magnetic sensor on the second unmanned aerial vehicle to sense the magnetic field intensity of the specified magnetic plug-in, and acquires a specified bypass strategy corresponding to the magnetic field intensity of the specified magnetic plug-in according to a corresponding relationship between a preset magnetic field intensity and a bypass strategy;

a bypass unit, used for the second unmanned aerial vehicle terminal to control the second unmanned aerial vehicle to bypass an area corresponding to the plurality of terrain pictures according to the specified bypass strategy;

a magnetic field intensity acquisition unit, used for, after the second unmanned aerial vehicle takes off, the third unmanned aerial vehicle terminal to control the third unmanned aerial vehicle to fly at the second height along the second track, and adopt a preset magnetic sensor on the third unmanned aerial vehicle to perform magnetic field signal acquisition on the ground corresponding to the second track during the flight to acquire a magnetic field intensity;

a magnetic field judgment unit, used for the third unmanned aerial vehicle terminal to judge whether the acquired magnetic field intensity is greater than a preset intensity threshold; and a specified magnetic plug-in recovery unit, used for, if the acquired magnetic field intensity is greater than the preset intensity threshold, the third unmanned aerial vehicle terminal to determine that the specified magnetic plug-in is sensed and starts a plug-in recovery device on the third unmanned aerial vehicle, such that the specified magnetic plug-in is recovered to the third unmanned aerial vehicle.

Operations performed by the above units respectively are in one-to-one correspondence with the obstacle-avoiding spraying method for the plant protection unmanned aerial vehicle in the above embodiments, which are not elaborated herein.

According to the obstacle-avoiding spraying device for the plant protection unmanned aerial vehicle of the present application, through special designs, the plant protection unmanned aerial vehicle is capable of avoiding obstacles for spraying operation, and the efficiency of the spraying operations is improved on the premise of preventing from blockage of the obstacles. It should be noted that the obstacle-avoiding spraying method for the plant protection unmanned aerial vehicle of the present application needs to be implemented jointly by three unmanned aerial vehicles, but the special part is that it is unnecessary for unmanned aerial vehicle terminals corresponding to the three unmanned aerial vehicles to communicate and interact with each other, such that the method has a wider application range and is easier to implement. Moreover, the present application adopts many special designs to ensure the plant protection unmanned aerial vehicle to perform efficient obstacle-avoiding spraying.

Referring to FIG. 2, the embodiment of the present invention further provides a computer device. The computer device may be a server, and an internal structure the computer device may be as shown in the figure. The computer device includes a processor, a memory, a network interface and a database which are connected through a system bus. The processor of the computer device is configured to provide computing and control capabilities. The memory of the computer device includes a nonvolatile storage medium and an internal memory. The nonvolatile storage medium stores an operating system, a computer program, and a database. The internal memory provides an environment for operations of the operating system and the computer program in the nonvolatile storage medium. The database of the computer device is configured to store data used by the obstacle-avoiding spraying method for the plant protection unmanned aerial vehicle. The network interface of the computer device is configured to communicate with an external terminal through a network. When the computer program is executed by the processor, an obstacle-avoiding spraying method for a plant protection unmanned aerial vehicle is implemented.

The processor performs the obstacle-avoiding spraying method for the plant protection unmanned aerial vehicle, the steps included in the method are respectively in one-to-one correspondence with the steps for performing the obstacle-avoiding spraying method for the plant protection unmanned aerial vehicle in the above embodiments, which are not elaborated herein.

Those skilled in the art may understand that the structure shown in the figure is only a block diagram of a part of the structure related to the solution of the present application and does not constitute a limitation to the computer device of the solution of the present application applied to the structure.

According to computer device of the present application, through special designs, the plant protection unmanned aerial vehicle is capable of avoiding obstacles for spraying operation, and the efficiency of the spraying operations is improved on the premise of preventing from blockage of the obstacles. It should be noted that the obstacle-avoiding spraying method for the plant protection unmanned aerial vehicle of the present application needs to be implemented jointly by three unmanned aerial vehicles, but the special part is that it is unnecessary for unmanned aerial vehicle terminals corresponding to the three unmanned aerial vehicles to communicate and interact with each other, such that the method has a wider application range and is easier to implement. Moreover, the present application adopts many special designs to ensure the plant protection unmanned aerial vehicle to perform efficient obstacle-avoiding spraying.

An embodiment of the present application further provides a computer readable storage medium, storing a computer program thereon. The computer program is executed by the processor to implement the obstacle-avoiding spraying method for the plant protection unmanned aerial vehicle, wherein the steps included in the method are respectively in one-to-one correspondence with the steps for performing the obstacle-avoiding spraying method for the plant protection unmanned aerial vehicle in the above embodiments, which are not elaborated herein.

According to computer readable storage medium of the present application, through special designs, the plant protection unmanned aerial vehicle is capable of avoiding obstacles for spraying operation, and the efficiency of the spraying operations is improved on the premise of preventing from blockage of the obstacles. It should be noted that the obstacle-avoiding spraying method for the plant protection unmanned aerial vehicle of the present application needs to be implemented jointly by three unmanned aerial vehicles, but the special part is that it is unnecessary for unmanned aerial vehicle terminals corresponding to the three unmanned aerial vehicles to communicate and interact with each other, such that the method has a wider application range and is easier to implement. Moreover, the present application adopts many special designs to ensure the plant protection unmanned aerial vehicle to perform efficient obstacle-avoiding spraying.

Those of ordinary skill in the art can understand that all or some of processes for implementing the methods of the foregoing embodiments may be completed through a computer program or by instructing relevant hardware. The computer program may be stored in a nonvolatile computer readable storage medium. When the computer program is executed, processes of the embodiments of the foregoing methods may be included. For any reference used for a memory, a storage, a database, or other mediums used in the embodiments and provided by the present application may include a nonvolatile memory and/or a volatile memory. The nonvolatile memory may include a read-only memory (ROM), a programmable ROM (PROM), an electrical programmable ROM (EPROM), an electrical erasable programmable ROM (EEPROM) or a flash memory. The volatile memory may include a random access memory (RAM) or an external cache memory. As illustration rather than limitation, RAM may be obtained in various forms, for example, a static RAM (SRAM), a dynamic RAM (DRAM), a synchronous DRAM (SDRAM), a double data rate SDRAM (SSRS-DRAM), an enhanced SDRAM (ESDRAM), a synchronous link (Synchlink) DRAM (SLDRAM), a memory bus (Rambus) direct RAM (RDRAM), a direct memory bus dynamic RAM (DRDRAM), a memory bus dynamic RAM (RDRAM), etc.

It should be noted that in the specification, the terms "include", "comprise" or any other variants thereof are intended to cover non-exclusive inclusion, such that a process, device, article or method including a series of elements not only includes those elements, but also includes other elements not explicitly listed, or further includes elements inherent to the process, device, article or method. In the absence of more restrictions, the element defined by the sentence "including a . . . " does not exclude the presence of other identical elements in the process, device, article or method including the element.

The above are only the preferred embodiments of the present application and do not limit the patent scope of the present application. Any equivalent structure or equivalent process transformation made by the contents of the specification and the drawings of the present application, or directly or indirectly applied to other related technical fields, are equally included in the patent protection scope of the present application.

What is claimed:

1. An obstacle-avoiding spraying method for a plant protection unmanned aerial vehicle, based on a first unmanned aerial vehicle terminal, a second unmanned aerial vehicle terminal and a third unmanned aerial vehicle terminal which are located on a first unmanned aerial vehicle, a second unmanned aerial vehicle and a third unmanned aerial vehicle respectively, the method comprising:

S101: the first unmanned aerial vehicle terminal controls the first unmanned aerial vehicle to fly at a preset first height along a preset first track and acquires a plurality of terrain pictures of a ground surface corresponding to the first track in real time during the flight;

S102: the first unmanned aerial vehicle terminal performs height identification processing on the plurality of terrain pictures by a preset terrain height identification method so as to acquire a specified terrain height corresponding to the plurality of terrain pictures;

S103: the first unmanned aerial vehicle terminal judges whether the specified terrain height is greater than a preset height threshold;

S104: if the specified terrain height is greater than the preset height threshold, the first unmanned aerial vehicle terminal inputs the plurality of terrain pictures into a preset scene type identification model for processing so as to acquire a first scene type which is output by the scene type identification model and corresponds to the plurality of terrain pictures, wherein the scene type identification model is trained by first training data based on a first convolutional neural network, the first training data being composed of a plurality of pre-acquired terrain pictures for training acquired in advance and a corresponding manually marked scene type;

S105: the first unmanned aerial vehicle terminal selects a specified magnetic plug-in corresponding to a specified scene type according to a mapping relationship between a preset scene type and a magnetic plug-in, wherein the magnetic plug-in is prestored on the first unmanned aerial vehicle, a magnetic field sealing device is preset on the magnetic plug-in, a first pattern painted by a first material is pre-drawn on a surface of the magnetic plug-in, a magnetic field intensity of the magnetic plug-in corresponds to the specified terrain height, and a control chip is preset on the magnetic plug-in and is able to receive a control signal to expose magnetism of the magnetic plug-in;

S106: the first unmanned aerial vehicle terminal uses a catapulting device preset on the first unmanned aerial vehicle to catapult the specified magnetic plug-in preset on the first unmanned aerial vehicle, such that the specified magnetic plug-in arrives at a specified area on a ground surface corresponding to the plurality of terrain pictures;

S201: after the first unmanned aerial vehicle takes off, the second unmanned aerial vehicle terminal controls the second unmanned aerial vehicle to fly at a second height along a second track, performs real-time spraying operations and adopts an optical sensor preset on the second unmanned aerial vehicle to perform signal acquisition on a ground surface corresponding to the second track, wherein the second height is lower than the first height, and the second track is parallel to the first track;

S202: the second unmanned aerial vehicle terminal judges whether a pattern presented by the signal acquired by the optical sensor is matched with the first pattern;

S203: if the pattern presented by the signal acquired by the optical sensor is matched with the first pattern, the second unmanned aerial vehicle terminal transmits a control signal to the specified magnetic plug-in to expose magnetism of the specified magnetic plug-in;

S204: the second unmanned aerial vehicle terminal uses a preset magnetic sensor on the second unmanned aerial vehicle to sense the magnetic field intensity of the specified magnetic plug-in, and acquires a specified bypass strategy corresponding to the magnetic field intensity of the specified magnetic plug-in according to a corresponding relationship between a preset magnetic field intensity and a bypass strategy;

S205: the second unmanned aerial vehicle terminal controls the second unmanned aerial vehicle to bypass an area corresponding to the plurality of terrain pictures according to the specified bypass strategy;

S301: after the second unmanned aerial vehicle takes off, the third unmanned aerial vehicle terminal controls the third unmanned aerial vehicle to fly at the second height along the second track, and adopts the preset magnetic sensor on the third unmanned aerial vehicle to perform magnetic field signal acquisition on the ground surface corresponding to the second track during the flight to acquire a magnetic field intensity;

S302: the third unmanned aerial vehicle terminal judges whether the acquired magnetic field intensity is greater than a preset intensity threshold; and S303: if the acquired magnetic field intensity is greater than the preset intensity threshold, the third unmanned aerial vehicle terminal determines that the specified magnetic plug-in is sensed and starts a plug-in recovery device on the third unmanned aerial vehicle, such that the specified magnetic plug-in is recovered to the third unmanned aerial vehicle.

2. The obstacle-avoiding spraying method for the plant protection unmanned aerial vehicle according to claim 1, wherein before the step S104: if the specified terrain height is greater than the preset height threshold, the first unmanned aerial vehicle terminal inputs the plurality of terrain pictures into the preset scene type identification model for processing so as to acquire the first scene type, the method comprises:

S1031: a plurality of terrain picture groups for training acquired in advance are retrieved and the plurality of terrain picture groups for training are divided into training data and verification data in proportion, wherein each of the plurality of terrain picture groups for training comprises a plurality of pre-acquired terrain pictures for training, all the pictures in each of the plurality of terrain picture groups for training being acquired by the unmanned aerial vehicle through image acquisition on the same ground surface, and each of the plurality of terrain picture groups for training being manually marked as a scene type;

S1032: the terrain picture groups for training in the training data are input into the preset first convolutional neural network for training by taking the group as a unit so as to acquire a temporal convolutional neural network model;

S1033: the temporal convolutional neural network model is verified by the terrain picture groups for training in the verification data to obtain a verification result and judge whether the verification result is pass or fail; and S1034: if the verification result is pass, the temporal convolutional neural network model is recorded as a scene type identification model.

3. The obstacle-avoiding spraying method for the plant protection unmanned aerial vehicle according to claim 1, wherein the step S105 comprises:

S10501: the first unmanned aerial vehicle terminal inputs the plurality of terrain pictures into a preset terrain contour identification model for processing so as to acquire a first terrain contour output by the terrain contour identification model, wherein the terrain contour identification model is based on a second convolutional neural network and is trained by the first training data; and S10502: the first unmanned aerial vehicle terminal selects a specified magnetic plug-in corresponding to the specified scene type and the terrain contour according to a bivariate mapping relationship of the preset scene type, the terrain contour and the magnetic plug-in, wherein in the bivariate mapping relationship, the scene type is one variable, the terrain contour is the other variable and the magnetic plug-in is the mapping result, the magnetic plug-in is prestored on the first unmanned aerial vehicle, a magnetic field sealing device is preset on the magnetic plug-in, a first pattern painted by a first material is pre-drawn on a surface of the magnetic plug-in, a magnetic field intensity of the magnetic plug-in corresponds to the specified terrain height, and a control chip is preset on the magnetic plug-in and is able to receive a control signal to expose magnetism of the magnetic plug-in.

4. The obstacle-avoiding spraying method for the plant protection unmanned aerial vehicle according to claim 1, wherein a first pattern painted by an ultraviolet light absorbing material is pre-drawn on the surface of the specified magnetic plug-in, the area on the surface of the magnetic plug-in except for the area painted by the ultraviolet light absorbing material is painted by a second material, a color of the second material is as same as that of the ultraviolet light absorbing material, and the second material is not the ultraviolet light absorbing material; the preset optical sensor on the second unmanned aerial vehicle is an ultraviolet sensor; and the step S202: the second unmanned aerial vehicle terminal judges whether a pattern presented by the signal acquired by the optical sensor is matched with the first pattern comprises:

S20201: the second unmanned aerial vehicle terminal performs contour extraction process on the pattern presented by the signal acquired by the optical sensor so as to extract a part where a signal intensity is weaker than a preset intensity threshold in the pattern presented by the signal acquired by the optical sensor to form a weak signal contour, S20202: the weak signal contour and the first pattern are subjected to nesting processing to obtain repeated area during the nesting processing, S20203: whether the repeated area is greater than a preset area threshold is judged, and S20204: if the repeated area is not greater than the preset area threshold, it is determined that the pattern presented by the signal acquired by the optical sensor is matched with the first pattern.

5. The obstacle-avoiding spraying method for the plant protection unmanned aerial vehicle according to claim 1, wherein the specified magnetic plug-in on the first unmanned aerial vehicle comprises an upper top surface, a lower bottom surface, n side surfaces and a magnetic core, the upper top surface being parallel to the lower bottom surface, the n side surfaces being connected to the upper top surface and the lower bottom surface respectively through n preset piezoelectric locks, each side surface having elasticity, the magnetic core being located in a space surrounded by the upper top surface, the lower bottom surface and the n side surfaces, the magnetic core being fixedly connected to the upper top surface through a non-metallic material and the magnetic core being fixedly connected to the lower bottom surface through a non-metallic material, and a non-metallic protective cover is arranged on the surface of the specified magnetic plug-in; the upper top surface, the lower bottom surface and the n side surfaces are all composed of a ferromagnetic material, the magnetic core is composed of a permanent magnetic material, the piezoelectric lock is made through electrostriction, the corresponding side surface is able to be separated from the upper top surface or the lower bottom surface when the piezoelectric lock receives an electrical signal, and the corresponding side surface keeps connecting to the upper top surface and the lower bottom surface when the piezoelectric lock does not receive an electrical signal; and the step S203: the second unmanned aerial vehicle terminal transmits a control signal to the specified magnetic plug-in to expose magnetism of the specified magnetic plug-in comprises:

S20301: the second unmanned aerial vehicle terminal transmits the control signal to the specified magnetic plug-in, such that the control chip in the specified magnetic plug-in acquires the control signal, S20302: the control chip in the specified magnetic plug-in transmits an electrical signal for starting to the n piezoelectric locks according to the control signal, and S20303: the n piezoelectric locks receive the electrical signal for starting, and an electrostriction phenomenon occurs according to the electrical signal for starting, such that the n side surfaces are separated from the upper top surface or the lower bottom surface and the magnetism of the specified magnetic plug-in is exposed.

6. An obstacle-avoiding spraying device for a plant protection unmanned aerial vehicle, based on a first unmanned aerial vehicle terminal, a second unmanned aerial vehicle terminal and a third unmanned aerial vehicle terminal which are located on a first unmanned aerial vehicle, a second unmanned aerial vehicle and a third unmanned aerial vehicle respectively, the device comprising:

a first flying unit, used for the first unmanned aerial vehicle terminal to control the first unmanned aerial vehicle to fly at a preset first height along a preset first track and acquires a plurality of terrain pictures of a ground surface corresponding to the first track in real time during the flight;

a terrain height identification unit, used for the first unmanned aerial vehicle terminal to perform height identification processing on the plurality of terrain pictures by a preset terrain height identification method so as to acquire a specified terrain height corresponding to the plurality of terrain pictures;

a height threshold judgment unit, used for the first unmanned aerial vehicle terminal to judge whether the specified terrain height is greater than a preset height threshold;

a first scene type acquisition unit, used for, if the specified terrain height is greater than the preset height threshold, the first unmanned aerial vehicle terminal to input the plurality of terrain pictures into a preset scene type identification model for processing so as to acquire a first scene type which is output by the scene type identification model and corresponds to the plurality of terrain pictures, wherein the scene type identification model is trained by first training data based on a first convolutional neural network, the first training data being composed of a plurality of pre-acquired terrain pictures for training acquired in advance and a corresponding manually marked scene type;

a specified magnetic plug-in acquisition unit, used for the first unmanned aerial vehicle terminal to select a specified magnetic plug-in corresponding to a specified scene type according to a mapping relationship between a preset scene type and a magnetic plug-in, wherein the magnetic plug-in is prestored on the first unmanned aerial vehicle, a magnetic field sealing device is preset on the magnetic plug-in, a first pattern painted by a first material is pre-drawn on a surface of the magnetic plug-in, a magnetic field intensity of the magnetic plug-in corresponds to the specified terrain height, and a control chip is preset on the magnetic plug-in and is able to receive a control signal to expose magnetism of the magnetic plug-in;

a catapulting unit, used for the first unmanned aerial vehicle terminal to use a catapulting device preset on the first unmanned aerial vehicle to catapult the specified magnetic plug-in preset on the first unmanned aerial vehicle, such that the specified magnetic plug-in arrives at a specified area on a ground surface corresponding to the plurality of terrain pictures;

a signal acquisition unit, used for, after the first unmanned aerial vehicle takes off, the second unmanned aerial vehicle terminal to control the second unmanned aerial vehicle to fly at a second height along a second track, perform real-time spraying operations and adopt an optical sensor preset on the second unmanned aerial vehicle to perform signal acquisition on a ground surface corresponding to the second track, wherein the second height is lower than the first height, and the second track is parallel to the first track;

a pattern matching judgment unit, used for the second unmanned aerial vehicle terminal to judge whether a pattern presented by the signal acquired by the optical sensor is matched with the first pattern;

a control signal transmitting unit, used for, if the pattern presented by the signal acquired by the optical sensor is matched with the first pattern, the second unmanned aerial vehicle terminal to transmit a control signal to the specified magnetic plug-in to expose magnetism of the specified magnetic plug-in;

a specified bypass strategy acquisition unit, used for the second unmanned aerial vehicle terminal to use a preset magnetic sensor on the second unmanned aerial vehicle to sense a magnetic field intensity of the specified magnetic plug-in, and acquires a specified bypass strategy corresponding to the magnetic field intensity of the specified magnetic plug-in according to a corresponding relationship between a preset magnetic field intensity and a bypass strategy;

a bypass unit, used for the second unmanned aerial vehicle terminal to control the second unmanned aerial vehicle to bypass an area corresponding to the plurality of terrain pictures according to the specified bypass strategy;

a magnetic field intensity acquisition unit, used for, after the second unmanned aerial vehicle takes off, the third unmanned aerial vehicle terminal to control the third unmanned aerial vehicle to fly at the second height along the second track, and adopt the preset magnetic sensor on the third unmanned aerial vehicle to perform magnetic field signal acquisition on the ground surface corresponding to the second track during the flight to acquire the magnetic field intensity;

a magnetic field judgment unit, used for the third unmanned aerial vehicle terminal to judge whether the magnetic field intensity is greater than a preset intensity threshold; and a specified magnetic plug-in recovery unit, used for, if the acquired magnetic field intensity is greater than the preset intensity threshold, the third unmanned aerial vehicle terminal to determine that the specified magnetic plug-in is sensed and starts a plug-in recovery device on the third unmanned aerial vehicle, such that the specified magnetic plug-in is recovered to the third unmanned aerial vehicle.

* * * * *